(12) United States Patent
Mandler

(10) Patent No.: US 10,022,800 B2
(45) Date of Patent: *Jul. 17, 2018

(54) SIMULTANEOUS TURNING DEVICE FOR FABRICATION OF EYEGLASS LENSES

(71) Applicant: OptoTech Optikmaschinen GmbH, Wettenberg (DE)

(72) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 224 days.

This patent is subject to a terminal disclaimer.

(21) Appl. No.: 14/845,555

(22) Filed: Sep. 4, 2015

(65) Prior Publication Data

US 2016/0074943 A1    Mar. 17, 2016

(30) Foreign Application Priority Data

Sep. 17, 2014  (DE) .................. 10 2014 113 421

(51) Int. Cl.
| | |
|---|---|
| *B23B 3/30* | (2006.01) |
| *B23B 5/00* | (2006.01) |
| *B23Q 39/04* | (2006.01) |
| *B23Q 7/04* | (2006.01) |

(Continued)

(52) U.S. Cl.
CPC .................. *B23B 3/30* (2013.01); *B23B 3/32* (2013.01); *B23B 5/00* (2013.01); *B23Q 7/048* (2013.01); *B23Q 39/04* (2013.01); *B23B 2215/40* (2013.01); *B23B 2250/16* (2013.01); *B23Q 2039/002* (2013.01)

(58) Field of Classification Search
CPC ............ B24B 13/0031; B24B 13/0037; B23Q 2039/002; B23Q 39/04; B23C 2215/40
See application file for complete search history.

(56) References Cited

U.S. PATENT DOCUMENTS

2006/0260448 A1* 11/2006 Fiedler ................... B23Q 1/015
82/1.11

FOREIGN PATENT DOCUMENTS

| DE | 203 14 702 | 1/2004 |
|---|---|---|
| DE | 10 2004 005 498 | 8/2005 |
| DE | 10 2006 050 425 | 5/2007 |

(Continued)

OTHER PUBLICATIONS

JP2002120109A Machine Translation Performed by Google Patents Sep. 6, 2017. (Year: 2017).*

(Continued)

*Primary Examiner* — Lisa L Herring
(74) *Attorney, Agent, or Firm* — Clark & Brody

(57) ABSTRACT

A turning device has two turning stations, each with a rotatable work piece spindle to hold a lens blank and each with a turning tool for the machining of a lens blank. A fabrication mechanism for the manufacturing of eyeglass lenses from lens blanks includes a milling device and the turning device, wherein the milling device has at least one milling station with a work piece holder to hold a lens blank and a milling tool for the machining of the lens blank. A loading device is configured to remove lens blanks from the milling device and load them into the turning device. A method for operating such a fabrication mechanism includes simultaneous machining of a third lens blank with the milling tool and a first and a second lens blank with the turning tools.

21 Claims, 5 Drawing Sheets

Figure 1:
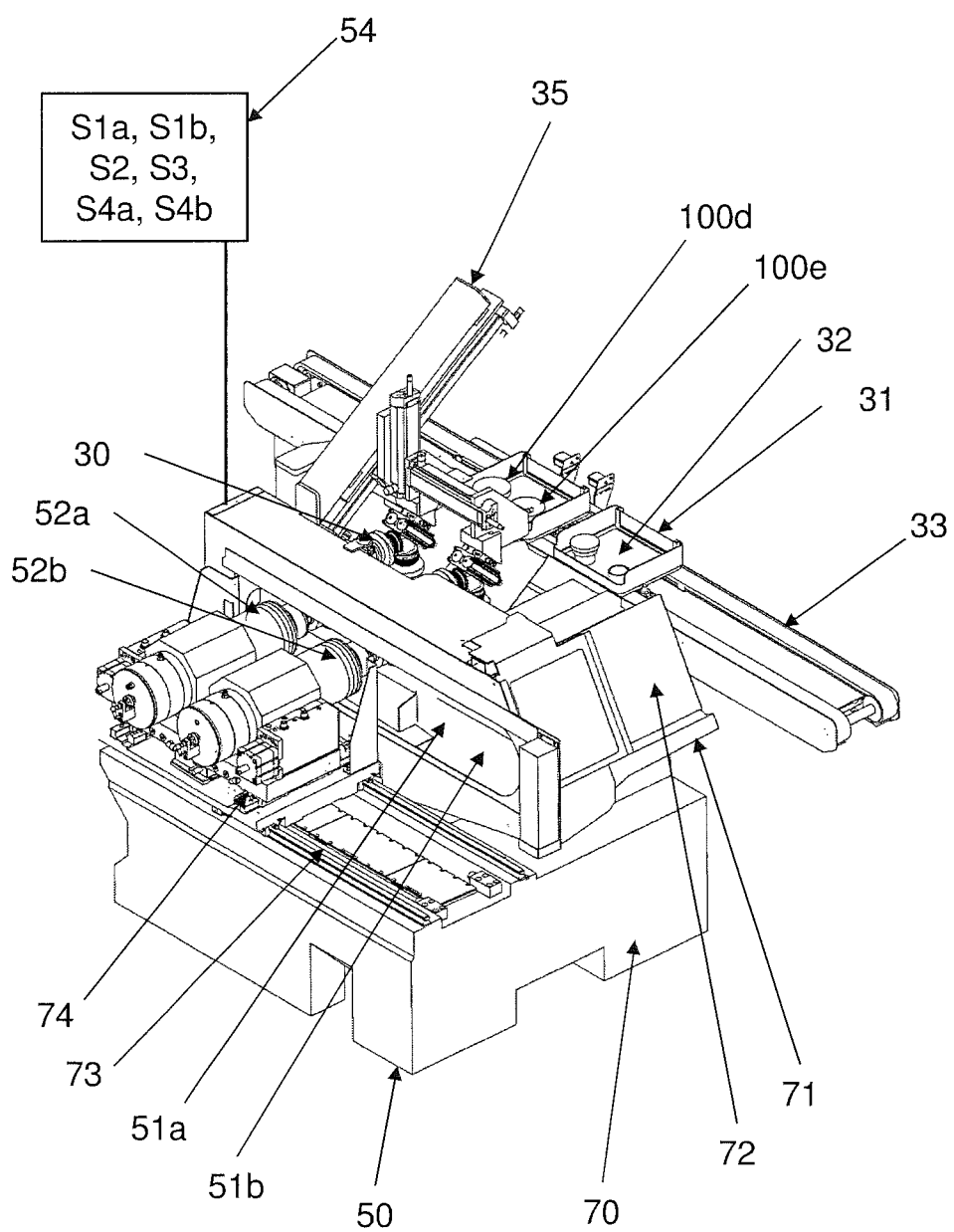

(51) Int. Cl.
*B23B 3/32* (2006.01)
*B23Q 39/00* (2006.01)

(56) References Cited

FOREIGN PATENT DOCUMENTS

| | | | |
|---|---|---|---|
| DE | 20 2006 021 076 | 4/2012 | |
| EP | 1 291 106 | 3/2003 | |
| EP | 1 719 582 | 11/2006 | |
| EP | 1 719 585 | 11/2006 | |
| JP | 2002120109 A * | 4/2002 | ......... B24B 13/0031 |
| WO | WO-2005005098 A1 * | 1/2005 | ............ B23Q 1/626 |

OTHER PUBLICATIONS

WO2005005098A1 Machine Translation Performed by Google Patents Sep. 7, 2017. (Year: 2017).*
DE102006050425A1 Machine Translation Performed by Google Patents Sep. 6, 2017. (Year: 2017).*

* cited by examiner

SIMULTANEOUS TURNING DEVICE FOR FABRICATION OF EYEGLASS LENSES

The invention concerns a turning device for the production of eyeglass lenses from lens blanks according to the preamble of claim 1, a fabrication mechanism with such a turning device according to claim 11 and a method for operating such a fabrication device according to claim 20.

In the prior art lens blanks are used for the production of eyeglass lenses, especially lens blanks of plastic such as polycarbonate, CR39 and so-called "High Index" materials. For reasons of efficiency, the lens blanks are machined in two stages to produce an individual surface, e.g., to produce eyeglass lenses by prescription, namely, first with a milling tool and then with a turning tool. There are combination milling and turning tools [EP 1 291 106 A] and machines with separate milling and (linear or rotational) turning units. In the latter, the eyeglass lenses are machined either in series [EP 1 719 585 A]—the same eyeglass lens is first milled and then turned in the work space of the machine—or in parallel [EP 1 719 582 A1]—different eyeglass lenses are machined at the same time in the work space of the machine, one being milled while the other is turned.

Thus, for example, a fabrication mechanism is known from DE 20 2006 021 076 U1, in which a machine on a machine frame has a work piece holder on a carriage, a milling tool and two turning tools. The work piece holder holds a lens blank indirectly across a block piece. However, a direct holding without block piece is also conceivable. The work piece holder at first is moved with the carriage into a working region of the milling tool and the lens blank is milled. Next, the work piece holder is moved into a working region of the first turning tool and the lens blank undergoes lathe machining. After this, the work piece holder is moved into a working region of the second turning tool and the lens blank undergoes another lathe machining. In this way, a spherical, aspherical, toroidal, atoroidal, progressive or freeform geometry can be produced. As a rule, the machining is followed by a fine grinding or polishing process to achieve the necessary surface texture. If need be, coating and/or hardening steps may also follow.

The drawback to a device according to DE 20 2006 021 076 U1 is that only a few lens blanks can be machined per unit of time. Thus, the production costs per machined lens blank are high.

The device of EP 1 719 582 A1 differs from DE 20 2006 021 076 U1, among other things, in that the turning unit has a work piece spindle and the milling unit has a separate work piece holder. In this way, two lens blanks can be machined at the same time, namely, one with the milling tool and one with the turning tool. By means of a loading mechanism, the milled lens blank is removed from the work piece holder and then placed directly in the work piece spindle, while at the same time a new lens blank is placed in the work piece holder.

This boosts the efficiency of the fabrication mechanism and lowers the production costs per machined lens blank as compared to DE 20 2006 021 076 U1. However, the efficiency is still not very high and the production costs per machined lens blank are high. Furthermore, vibrations are transferred from the milling unit to the turning unit, so that the precision of the turning process is low.

The problem which the invention addresses is to eliminate the drawbacks of the prior art, and to provide a device as well as a method with which a high-quality machining of the lens blanks, a boosting of efficiency, and a lowering of production costs per machined lens blank can be achieved. The invention should be reliable, simple to operate, and cost favourable. The main features of the invention are indicated in the characterizing passage of claim 1, in claim 11 and in claim 20. Embodiments are the subject matter of claims 2 to 10 and 12 to 19 and 21 to 23.

The invention concerns a turning device having a first turning station with a rotatable first work piece spindle to hold a lens blank and a first turning tool for the machining of a lens blank wherein at least one second turning station with a rotatable second work piece spindle is provided to hold a second lens blank and a second turning tool for the machining of a second lens blank.

The advantage of the turning device according to the invention is that the at least two turning stations can simultaneously machine at least two lens blanks. For this, it should be possible to operate the turning stations simultaneously. This results in an especially high efficiency of the turning device and low production costs per machined lens blank, because an upstream milling process per lens blank, which naturally has more coarse manufacturing tolerances, generally takes less time than the turning process, which produces a highly precise surface. Typically, the milling process is around 40% and the turning process around 60% of the total machining time. Thanks to the two turning stations, the cycle times of the milling device and the turning device are well coordinated with each other. Since the milling tool according to the invention typically does not have to wait for the turning tool, the throughput of machinable lenses per unit of time increases substantially. This requires hardly more room for the turning device and the turning device can be combined with a plurality of milling devices, especially without having to split up the manufacturing chain of a milling tool into two lathes, for example. The turning device preferably has a CNC control system, for automated operation if possible.

In one variant configuration of the turning device it has a loading device, which is configured to load lens blanks into the work piece spindles. Thus, the loading is automated and can be easily carried out. Preferably, the loading device also unloads the work piece spindles.

In a special variant of the loading device, a pair of holding means is provided for each turning station to hold two lens blanks, the holding means of the pairs being oriented at an angle to each other and interconnected, and the pairs of holding means being able to rotate about a common turning axis. This enables a very fast replacement of lens blanks in the work piece spindles. Thus, the efficiency of the turning device is especially high. Such pairs of holding means or the turning axis can be mounted on a transport arm, especially for a parallel displacement of the turning axis. For the angled connection of the pairs, a right-angled arrangement of the two holding means 34 works well. Preferably, the turning axis is oriented perpendicular to the spindle axes of the work piece spindles. Moreover, the spacing between the pairs of holding means preferably corresponds to the spacing between the spindle axes. Thus, only a few movement sequences need to be carried out for a lens blank replacement and correspondingly few actuators are needed.

Furthermore one variant of the invention has the work piece spindles with parallel oriented spindle axes. This enables a compact configuration of the turning device and the work piece spindles and the loading device have an uncomplicated motion kinematics. In particular, the work piece spindles can share actuators/drive units. For the same reasons, the work piece spindles are preferably arranged in a common spindle plane.

Furthermore, the option exists that the turning stations, preferably the work piece spindles, have a common transverse drive, with which the spacing of the turning tools relative to the spindle axis of a coordinated work piece spindle can be changed, in particular, transversely to the spindle axis or by a displacement in the spindle plane. Thus, the turning stations can be arranged alongside each other in space-saving manner, since no collisions are possible, especially if the turning tools are arranged on a common transverse carriage. Furthermore, a common transverse drive can be cheaply realized. Optionally, the work piece spindles can travel out from the working region of the turning tools for the lens blank replacement. Moreover, the turning tools are preferably oriented parallel to each other. Furthermore, the turning tools should be arranged in a common tool plane. Alternatively or additionally, the turning tools can also have a common second transverse drive, especially when the turning tools are arranged on a common second transverse carriage.

In one special embodiment, the turning stations have a common machine frame and/or a common machine bed. According to another preferred embodiment, the turning tools lie in a common work space. Both solutions contribute to a compact configuration and all parts of the turning device are positioned precisely to one another. Safety mechanisms can also be easily provided.

Another configuration option is for the turning stations, preferably the work piece spindles, to have a common linear drive with which the spacing of the turning tools relative to a coordinated work piece spindle can be changed, especially in the axial direction of the spindle axes or by a parallel displacement of the spindle plane. Thus, only one linear drive is needed, especially if the work piece spindles are mounted on a common longitudinal carriage. This is economical. Alternatively or additionally, the turning tools can also have a common second linear drive, especially when the turning tools are arranged on a common second longitudinal carriage.

The longitudinal carriages and the transverse carriages can be configured here as a cross table arrangement. The optional second longitudinal carriage and second transverse carriage can also be configured as a second cross table arrangement.

Alternatively, the work piece spindles and/or the turning tools can also have independent linear and/or transverse drives. This would achieve an especially high flexibility, whereby two greatly differing surface topographies could be machined at the same time.

Furthermore, a special configuration of the turning device has each turning tool with its own fast tool servomotor, by which the infeed depth can be changed with respect to a coordinated work piece spindle. Thus, the turning tools can be fed in independently of each other and in this way produce different surface topographies on the lens blanks.

Preferably, the linear drive has a maximum first travel and the fast tool servomotors a maximum second travel, while the maximum first travel corresponds to at least 10 times the maximum second travel. This makes it possible to produce with the large first travel of the linear drive a coarse and essentially rotationally symmetrical surface topography, especially on each lens blank in the turning device. At the same time, the fast tool servomotors with the small second travel take care of the individualization of the surface topography. It is possible here to produce non-rotationally symmetrical surface topographies, which can also be configured different between the turning stations. Especially suitable is a particular configuration of the turning device in which the fast tool servomotor has a piezo-drive. Piezo-drives are especially fast and precise.

Moreover, an optional configuration is provided in which the turning device has a control electronics to put out drive signals to the work piece spindles, the transverse drive, the linear drive and the fast tool servomotors, wherein the drive signals of the control electronics are matched up with each other. In this way, even in the case of common transverse and linear drives it is possible to produce the desired surface topographies. Accordingly, the drive signals of the control electronics should be matched up with each other for the simultaneous making of different surface topographies on the lens blanks.

The invention furthermore concerns a fabrication mechanism for the manufacturing of eyeglass lenses from lens blanks, with a milling device and with a turning device as described above. The milling device has at least one milling station with a work piece holder to hold a lens blank and a milling tool for machining the lens blank. Moreover, a loading device is provided, which is configured to remove lens blanks from the milling device and load them into the work piece spindles, preferably in fully automated manner.

The advantage of the fabrication mechanism according to the invention is that thanks to the at least two turning stations provided and the independence of the work piece holders from the work piece spindles at least two lens blanks can be machined by turning and milling at the same time. This results in an especially high efficiency of the fabrication mechanism and low production costs per machined lens blank. Since the milling tool of the invention typically needs little or no waiting for the turning tool, the throughput of machined lenses per unit of time rises substantially. The fabrication mechanism preferably has a common CNC control system.

The milling device is preferably suitable not only for the machining of the lens surface but also for machining the lens circumference. For this, there can be provided a surface milling cutter, especially a ball-head milling cutter, for the surface machining, and an edge milling cutter, especially an end mill, for the circumference machining. Preferably the two can be or are driven independently and simultaneously.

In a more specific embodiment of the fabrication mechanism the turning device has 1.5 times to 2.5 times as many turning stations as the milling device has milling stations. In this way, the machining speed of the turning device and the milling device can be attuned to each other so that only very slight waiting times exist for the milling device and the turning device.

According to a special variant of the fabrication mechanism the milling device has precisely one milling station and the turning device precisely two turning stations. This accomplishes a high efficiency with reasonable production costs for the fabrication mechanism.

Basically the turning device and the milling device can be independent machines which are arranged along a manufacturing line in different positions. In this way, existing turning and/or milling devices can be combined with each other.

For a compact configuration of the fabrication mechanism and a precise relative arrangement with respect to each other, a configuration is advisable in which the milling device and the turning device have a common machine frame and/or a common machine bed. A common machine bed costs little, it can be monolithic in configuration, and all machine parts are positioned correctly relative to each other. According to one special embodiment, the milling device, the turning device and the loading device have a common machine frame and/or a common machine bed. In this way, the loading device is also positioned precisely relative to the turning and the milling device.

In a modified variant, the milling device and the turning device are vibration-decoupled, preferably by foundations separated by the floor. Thus, no vibrations can be transmitted from the milling device to the turning device and the precision of the turned surface is high. Separate machine beds of the milling and the turning device also contribute to this. Furthermore, transport is easier on account of the lower individual weights. Separate machine beds can be positioned relative to each other through an optional common machine frame. Preferably, however, the floor forms the only mechanical connection between the milling device and the turning device. The loading device is preferably separated at least mechanically from the milling device or at least mechanically from the milling device. A mechanical connection of the loading device to the floor can be provided each time.

The fabrication mechanism can be provided cheaply if the milling device and the turning device are arranged in a common manufacturing cell. Preferably, the loading device is also arranged in the manufacturing cell. The manufacturing cell should have a housing shell, inside which the turning device and the loading device are arranged. Work safety devices such as entrance barriers then only need to be provided once for both devices. Preferably, the manufacturing cell is vibration-decoupled from the turning device and/or the milling device.

For the protection of the high precision turning device it is advisable to expand the fabrication mechanism such that the milling device and the turning device are arranged in separate work spaces, while the work spaces are preferably separated from each other at least in regard to transfer of machining chips. This is accomplished either by sufficient distance between the milling device and the turning device or by mechanical separation means such as chip shields, flaps or housing each time between the milling device and the turning device.

According to a more specific configuration of the loading device, this has a transport means for the transport of a lens blank from the milling station to the turning stations. Preferably, the transport means is movable between the work piece holders and the work piece spindles. For short distances and a precise positioning, transport arms with grips or suction cups are suitable. Longer distances can be spanned with slides, conveyor belts, or conveyor rails. At their ends another transport arm can be provided for passing the lens blanks to or from the work piece spindles and/or work piece holders.

In order to remove a lens blank from the work piece holder even when lens blanks are being held in the work piece spindles, the loading device should have a lens magazine for at least one lens blank, preferably for at least two lens blanks. In particular, the loading device should be able to hold as many lens blanks as the turning device has turning stations. In this way, at least as many premilled lens blanks can be kept on hand as can be placed in the work piece spindles. Especially preferably, the loading device has a lens magazine for at least twice as many lens blanks as the turning device has turning stations. In this way, the loading device, preferably a transport arm, can hold at the same time two new lens blanks and two lathe machined lens blanks. This enables an especially fast changing of lens blanks.

Furthermore, the invention concerns a method for the operation of a fabrication mechanism as described above, in which the following steps are carried out:

a) loading of a first lens blank into the work piece holder and machining of the first lens blank with the milling tool;
b) removal of the first lens blank from the work piece holder with the loading device;
c) subsequent loading of a second lens blank into the work piece holder and machining of the second lens blank with the milling tool;
d) subsequent removal of the second lens blank from the work piece holder with the loading device;
e) loading of the first and second lens blank into the work piece spindles with the loading device, preferably at the same time, and loading of a third lens blank into the work piece holder;
f) Simultaneous machining of the third lens blank with the milling tool and of the first and second lens blank with the turning tools.

It will be recognized that with this method two lens blanks are machined by turning and one lens blank by milling in a particular time slot. The numbering of the lens blanks has nothing to do with the working off of the sequence of the method. It is only important that two lens blanks are machined by turning while a third lens blank is machined by milling. Therefore, for example, it does not matter if the loading device has a lens magazine for several lens blanks and other lens blanks are machined between the first, second and third lens blank.

It is advantageous for the method that an especially high efficiency of the fabrication mechanism and low production costs per machined lens blank are achieved. Thanks to the number of turning stations per milling station the waiting times of the milling and or the turning tools can be reduced. In this way, the throughput of machined lenses per unit of time is high. Preferably, with the milling process one leaves an allowance for the turning process of 0.2 mm to 0.3 mm as compared to the desired surface topography. It is essentially possible to create a rotationally symmetrical surface with the milling tool, or to create already a non-rotationally symmetrical surface topography. In the latter case, the milling device already produces a free-form surface if such a one is to be lathe machined afterwards.

Preferably the circumferential geometry of the lens blank is also machined with the milling tool. In this way, already at this point in time a circumferential geometry adapted to an eyeglass lens frame can be produced. To avoid breakage on the lens margin during later entry and exit of the turning tool, a bevel should be produced with the milling tool at the circumference of the lens blank.

According to a more specific layout of the method, step g) is provided, in that there is a removal of the third lens blank from the work piece holder with the loading device and a loading of a fourth lens blank into the work piece holder and a machining of the fourth lens blank with the milling tool (all) during the machining of the first and the second lens blank with the turning tools. This ensures that the milling tool does not have to wait for the turning tool, which in a typical application takes longer for each lens blank than the milling tool.

The method can be optionally continued with the following steps:

h) removal of the first and the second lens blank from the work piece spindles;
i) subsequent loading of one or the third and one or the fourth lens blank into the work piece spindles with the loading device and loading of a fifth lens blank into the work piece holder;
j) repeating of steps f) through i).

With this an endless loop is achieved, resulting in a high throughput of machined lens blanks. The repeating of steps f) through i) is done with adapted numbering of the lens blanks.

In a special variant of the method, the turning stations have a common transverse drive, with which the spacing of the turning tools relative to the spindle axis of a coordinated work piece spindle can be changed, and the turning stations have a common linear drive, with which the spacing of the turning tools relative to a coordinated work piece spindle can be changed, where each turning tool has its own fast tool servomotor, with which the infeed depth can be changed with regard to a coordinated work piece spindle, while the turning device has a control electronics for putting out drive signals to the work piece spindles, the transverse drive, the linear drive and the fast tool servomotors, and the drive signals of the control electronics are attuned to each other, and where the control electronics attunes the drive signals to each other such that the drive signals for the fast tool servomotors accomplish at least a temporary opposite running of the fast tool servomotors for vibration dampening.

In this way, the vibrations can be specifically cancelled out or mitigated by the fast-acting fast tool servomotors. This is accomplished, for example, in that the drive signals for the fast tool servomotors bring about an opposite running of the fast tool servomotors at least on a large set point gradient of the infeed depth as compared to the rest of the surface topography. By a large set point gradient is meant 20% of the largest set point gradient of a surface topography being produced for each revolution of the work piece spindle. In particular, the rhythm of the fast tool servomotors can be attuned to each other by modulating the rotational speeds of the work piece spindles.

According to the method, the control electronics for the purpose of vibration dampening should put out drive signals to the work piece spindles which bring about an opposite running or a concurrent running of the work piece spindles. A decision making logic for the direction and speed of rotation of the work piece spindles is provided with the aid of a vibration simulation.

Insofar as individual surface topographies are to be produced on all lens blanks, the attuning of the drive signals is done for each pair of lens blanks being machined. Preferably, the attuning is at least partly established already prior to the loading of the pair of lens blanks into the work piece spindles.

According to one preferred embodiment of the method, different surface topographies are produced on the lens blanks simultaneously in the turning stations. This makes allowance for the usually necessary individual correction for visual defects of an eye.

Figure 2:
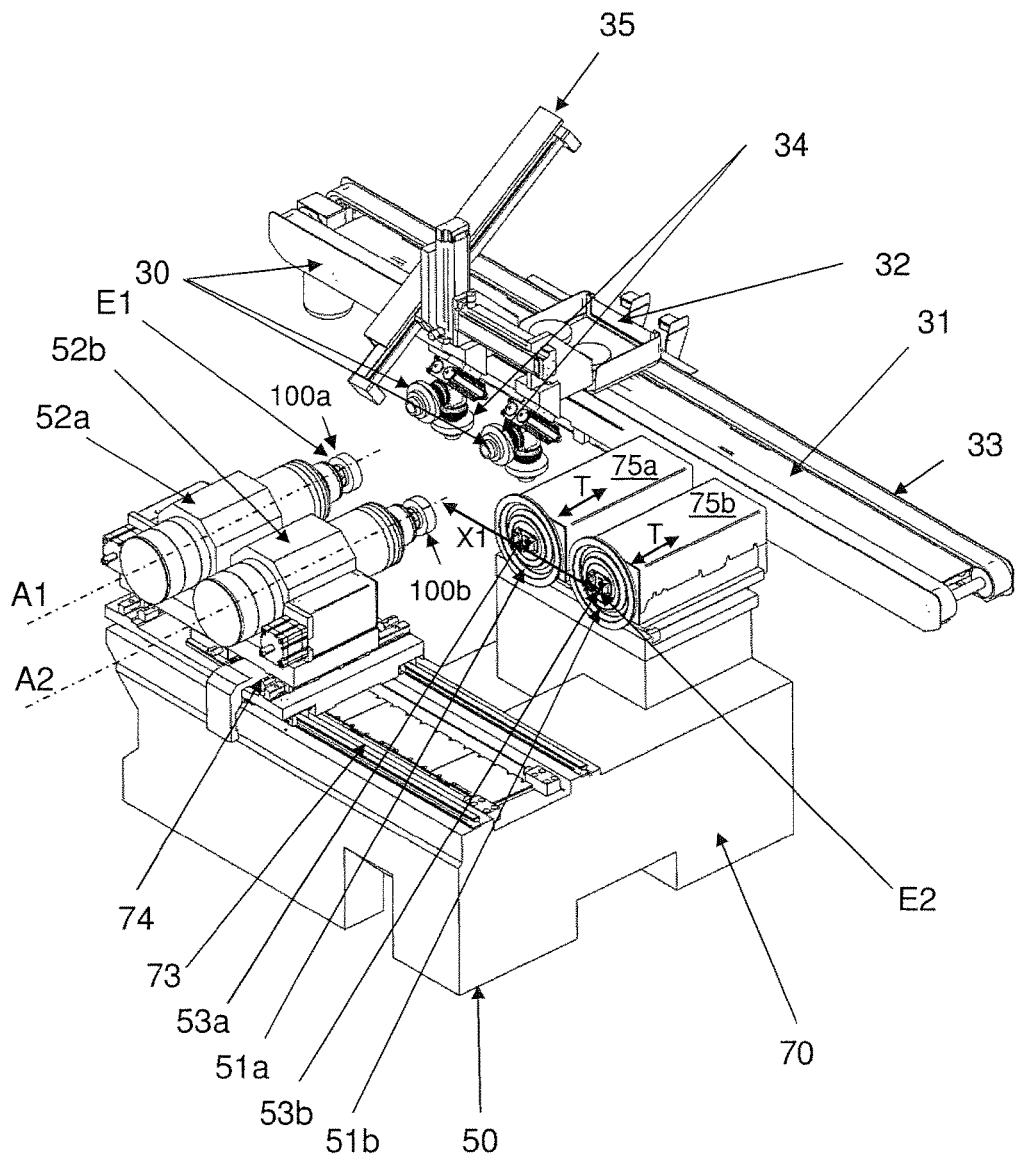
Figure 3:
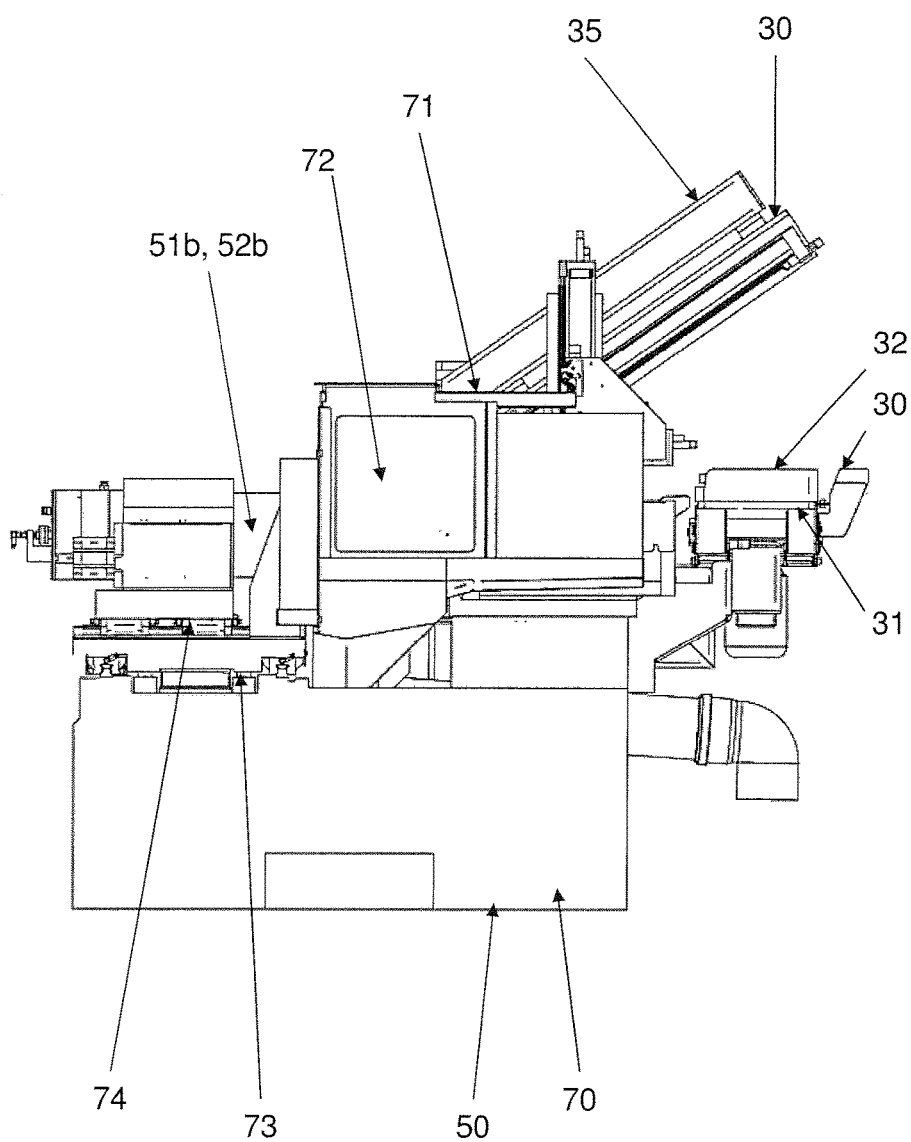
Figure 4:
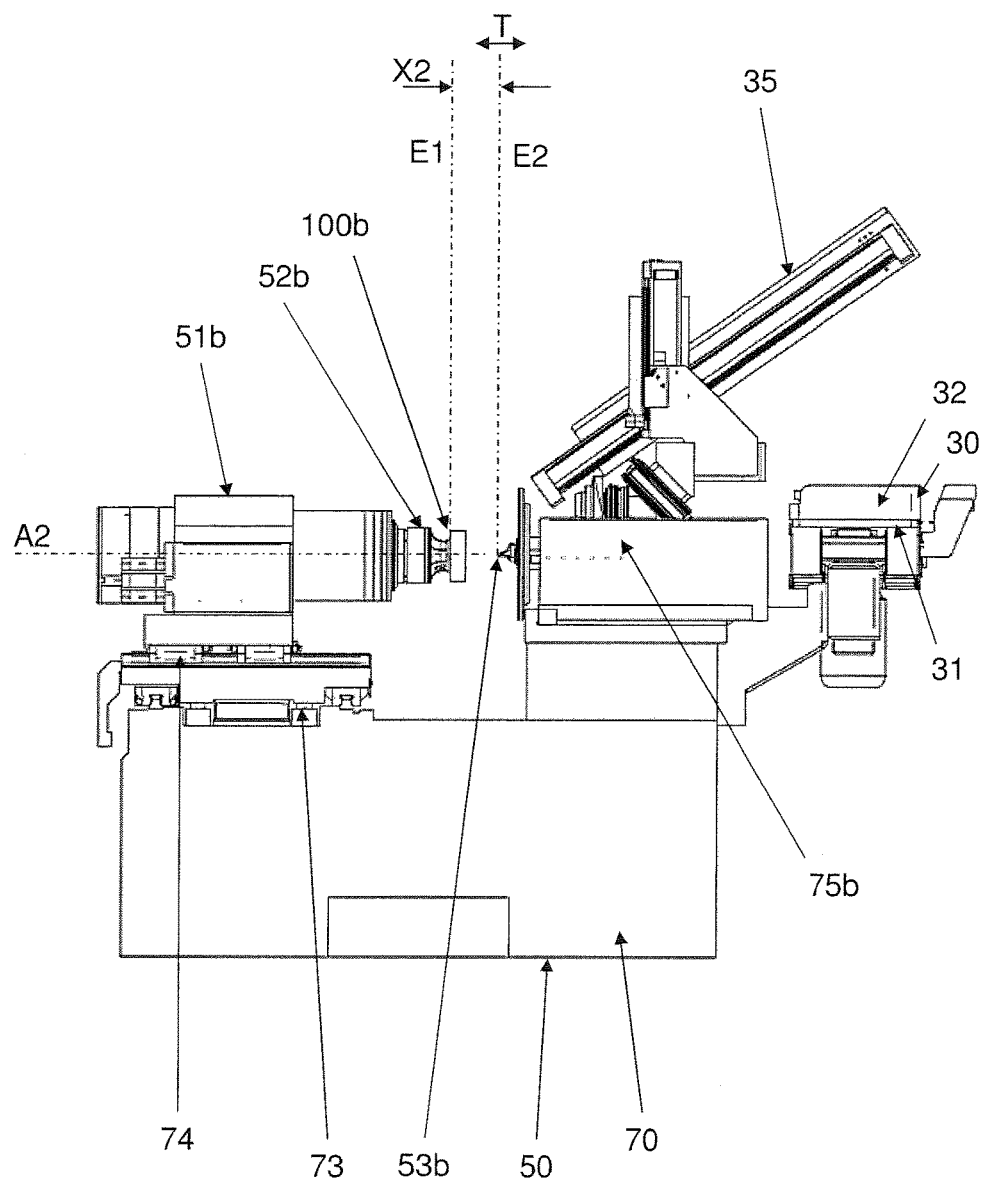

Further features, details and benefits of the invention will emerge from the wording of the claims and from the following description of sample embodiments with the aid of the drawings. There are shown:

FIG. 1 a perspective view of a turning device;

FIG. 2 a perspective view of a turning device with housing removed;

FIG. 3 a side view of a turning device;

FIG. 4 a side view of a turning device with housing removed; and

Figure 5:
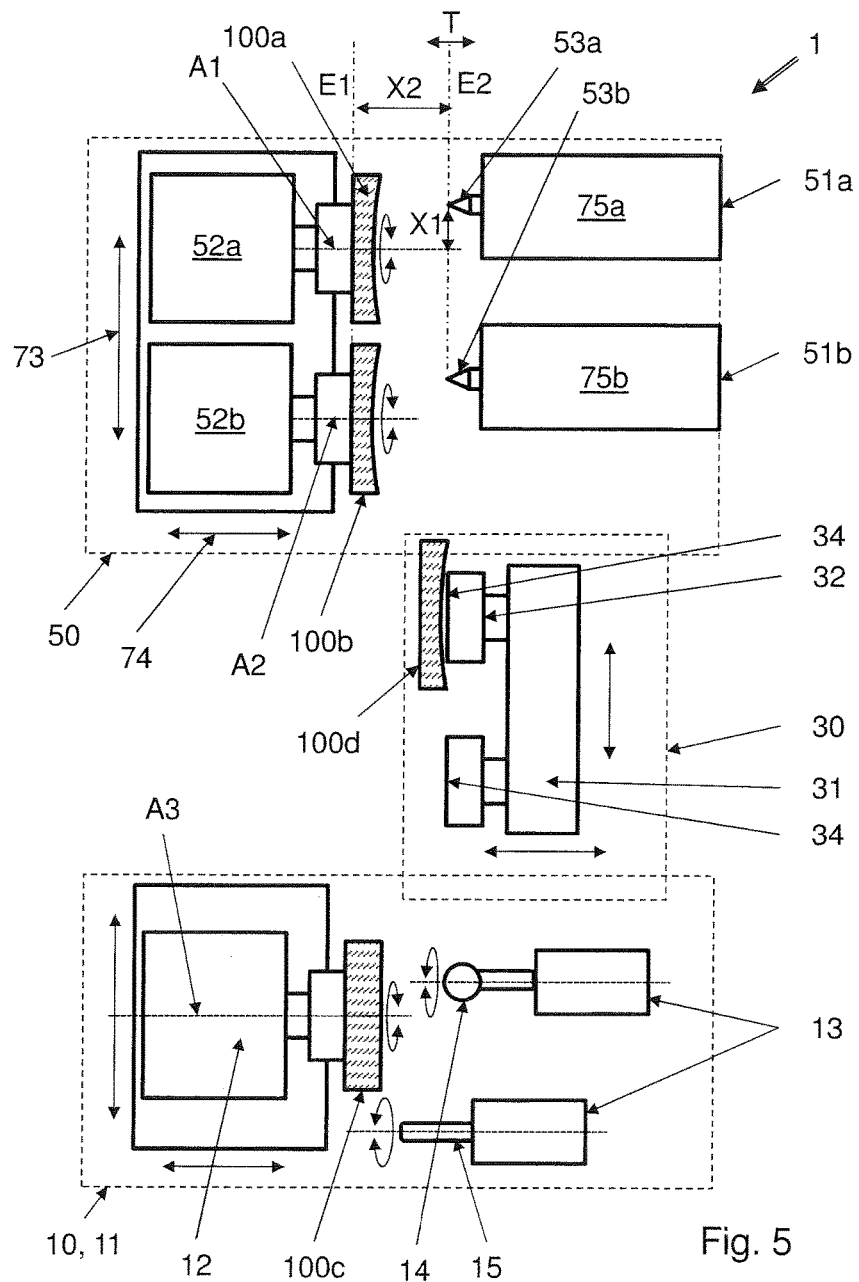

FIG. 5 a diagram of a fabrication mechanism with a turning device and a milling device.

FIGS. 1, 2, 3 and 4 show from various perspective views a turning device 50, which has two turning stations 51*a*, 51*b*. Not all technical features and thus not all reference numbers are visible in each of FIGS. 1 to 4. The first turning station 51*a* has a rotatable first work piece spindle 52*a* to hold a first lens blank 100*a* and a first turning tool 53*a* for the machining of the lens blank 100*a* so held. At the same time, the second turning station 51*b* has a rotatable second work piece spindle 52*b* to hold a second lens blank 100*b* and a second turning tool 53*b* for the machining of the second lens blank 100*b* so held. The first and the second work piece spindles 52*a*, 52*b* have parallel oriented spindle axes A1, A2. Furthermore, the first and the second work piece spindle 52*a*, 52*b* are arranged in a common spindle plane E1. The turning stations 51*a*, 51*b* are of the same type and are designed for machining of lens blanks 100*a*, 100*b* of the same type. In particular, the work piece spindles 52*a*, 52*b* are (for the most part) identical in design and the turning tools 53*a*, 53*b* are (for the most part) identical in design.

The first and second work piece spindle 52*a*, 52*b* of the two turning stations 51*a*, 51*b* are mounted on a common machine bed 70, which is monolithic in design. Furthermore, the two turning stations 51*a*, 51*b* have a common transverse drive 73, with which the spacing X1 of the turning tools 53*a*, 53*b* relative or transverse to the spindle axis A1, A2 of a coordinated work piece spindle 52*a*, 52*b*, respectively, can be changed. For this, the first and the second work piece spindle 52*a*, 52*b* are mounted on a common transverse carriage. In this way, the work piece spindles 52*a*, 52*b* can also be driven out to the side from the work space of the turning tools 53*a*, 53*b* for a blank change, as shown in FIG. 2.

In addition, the turning stations 51*a*, 51*b*, especially the work piece spindles 52*a*, 52*b*, have a common linear drive 74, with which the spacing X2 of the turning tools 53*a*, 53*b* relative to a coordinated work piece spindle 52*a*, 52*b* can be changed, especially in the axial direction of the spindle axes A1, A2. For this, the two work piece spindles 52*a*, 52*b* are mounted on a common longitudinal carriage. The longitudinal carriage, in turn, is mounted on the transverse carriage, which in turn is mounted on the machine bed 70. In this way, there is a cross table arrangement on the machine bed 70.

Optionally, the work piece spindles 52*a*, 52*b* and/or the turning tools 53*a*, 53*b* can also have independent linear and/or transverse drives 73, 74. If independent linear and transverse drives 73, 74 are provided, there will be two independent cross table arrangements. An especially high flexibility would be achieved, and at the same time two greatly differing surface topographies could be machined.

Both turning tools 53*a*, 53*b* have their own fast tool servomotor 75*a*, 75*b* with piezo-drive, with which the infeed depth T can be changed in relation to a coordinated work piece spindle 52*a*, 52*b*. The fast tool servomotors 75*a*, 75*b* are firmly connected to the machine bed 70. The turning tools 53*a*, 53*b*, especially lathe cutters or cutting inserts, are also oriented parallel to each other and arranged in a common tool plane E2. The maximum travel of the linear drive 74 is at least 10 times larger than the maximum travel of the fast tool servomotors 75*a*, 75*b* and the lathe cutters/cutting inserts driven by them.

Both turning stations 51*a*, 51*b* can be driven at the same time. With the cross carriages, two lens blanks 100*a*, 100*b* can be positioned at the same time rotating in front of the turning tools 53*a*, 53*b*. Since the turning device 50 has a control electronics 54 for putting out drive signals S1*a*, S1*b*, S2, S3, S4*a*, S4*b* to the work piece spindles 52*a*, 52*b*, the transverse drive 73, the linear drive 74 and the fast tool servomotors 75*a*, 75*b* (see FIG. 1), and the drive signals S1*a*, S1*b*, S2, S3, S4*a*, S4*b* of the control electronics 54 are matched up with each other, different surface topographies can be produced on the two lens blanks 100a, 100b at the same time.

Furthermore, a loading device 30 is provided, which is designed to load lens blanks 100a, 100b, 100d, 100e into the work piece spindles 52a, 52b. For this, the loading device 30 has transport means 31 and a lens magazine 32. The transport means 31 include a conveyor rail 33 and holding means 34 on a transport arm 35. The holding means 34 have suction cups. The optional and special configuration of the loading device 30 calls for four holding means 34 to be mounted on the transport arm 35. Every two of the four holding means 34 are joined together at an angle, here in particular, a right angle. The two pairs of holding means 34 are able to turn about a common turning axis. The turning axis is oriented perpendicular to the spindle axes A1, A2. Furthermore, the distance between the pairs of holding means 34 corresponds to the distance between the spindle axes A1, A2. On the conveyor rail 33 there are arranged carriages/carts, with which large distances can be covered. The carriages/carts together with the holding means 34 form the lens magazine 32.

With this arrangement of the loading device 30 it is possible to take up two previously milled lens blanks at the same time, in particular one lens blank per pair of the holding means 34. With the two free holding means 34 it is then possible to remove two lens blanks 100a, 100b from the work piece spindles 52a, 52b. After a rotation of the pairs of holding means by 90 degrees, the lens blanks previously taken up can be loaded into the work piece spindles 52a, 52b. The already machined lens blanks 100a, 100b are then set down on the free carriages/carts. Two new premilled lens blanks are then provided with a new carriage/cart and can be picked up by the holding means 34. The loading and unloading of the work piece spindles 52a, 52b is thus especially fast and the efficiency of the turning device 50 is high. Of course, the angle of rotation of the pairs of holding means depends on the angle between their legs and need not be exactly 90 degrees.

With the conveyor rail 33 the turning device 50 can be easily linked to other machines, such as milling devices and/or coating devices. The loading device 30 or parts thereof should be connected to the machine bed 70. In particular, the transport arm 35 should have a firm connection with the machine bed 70. In this way, it is oriented exactly with respect to the work piece spindles 52a, 52b. The conveyor rail is preferably vibration-decoupled from the machine bed 70 or an additional machine frame.

As can be seen in FIGS. 1 and 3, the two turning stations 51a, 51b of the turning device 50 are arranged in a common manufacturing cell 71. The manufacturing cell 71 is formed by a housing shell 72. Between the turning stations 51a, 51b there is only a gap, but no mechanical elements. Chip shields or the like can be provided optionally. The transport arm 35 connects the conveyor rail 33 outside the manufacturing cell 71 to the work piece spindles 52a, 52b arranged inside the manufacturing cell 71. In this way, the turning device 50 can be combined with a milling device, while the turning stations 51a, 51b are arranged in a work space which is independent of the milling tool. Therefore, a chip transfer between the turning and the milling device is prevented.

A fabrication mechanism 1 for the manufacture of eyeglass lenses from lens blanks 100a, 100b, 100c, 100d, 100e, with a milling device 10 and a turning device 50, is shown in the diagram of FIG. 5.

Of the turning device 50, one notices in particular two turning stations 51a, 51b. The two turning stations 51a, 51b each have a rotatable work piece spindle 52a to hold a lens blank 100a, 100b, 100c, 100d, 100e and a turning tool 53a, 53b for the machining of a lens blank 100a, 100b, 100c, 100d, 100e so held.

The work piece spindles 52a, 52b have parallel oriented spindle axes A1, A2 and are arranged in a common spindle plane E1. By means of a common transverse drive 73 the work piece spindles 52a, 52b can be moved in the spindle plane E1 such that the spacing X1 of the turning tools 53a, 53b relative to the spindle axis A1, A2 of a coordinated work piece spindle 52a, 52b can be changed.

Furthermore, the work piece spindles 52a, 52b have a common linear drive 74, by which the spacing X2 of the turning tools 53a, 53b relative to a coordinated work piece spindle 52a, 52b can be changed, in particular, by a parallel displacement of the spindle plane E1.

Opposite the work piece spindles 52a, 52b are firmly mounted the turning tools 53a, 53b. The two lathe cutters of the turning tools 53a, 53b lie with their cutting edges 55a, 55b in the plane of the spindle axes A1, A2 of the two work piece spindles 52a, 52b. Furthermore, the distance between the cutting edges 55a, 55b of the lathe cutters corresponds to the distance between the two spindle axes A1, A2. One notices that the two turning tools 53a, 53b are also oriented parallel to each other and are arranged in a common tool plane E2, this applies especially to the lathe cutters. Each turning tool 53a, 53b has its own fast tool servomotor 75a, 75b with a piezo-drive, by which the infeed depth T of the cutting edges of the lathe cutters 53a, 53b can be changed relative to a coordinated work piece spindle 52a, 52b. The linear drive 74 has a maximum first travel and the lathe cutters 53a, 53b a maximum second travel, the maximum first travel being at least 10 times the maximum second travel.

In this way, the turning stations 51a, 51b can be driven simultaneously. Even so, different surface topographies can be machined on the lens blanks 100a, 100b at the same time. This is especially because of the rapid and independent modulation of the infeed depth T.

Furthermore, one sees in FIG. 5 the milling device 10 with exactly one single milling station 11. On a work piece holder 12 of the milling station 11, a third lens blank 100c has been taken up. In the present instance, the work piece holder 12 has a spindle drive for rotating the lens blank 100c about a turning axis A3. The work piece holder 12 is movable in the longitudinal and transverse direction, especially thanks to a cross table arrangement.

Opposite the work piece holder 12 is firmly positioned a milling tool 13. The milling tool 13 has a surface milling cutter 14, especially with ball-head milling cutter, with a first drive, and an edge milling cutter 15, especially with end mill, with a second drive.

By movements of the work piece holder 12 in the longitudinal and transverse direction as well as rotation of the third lens blank 100c, the latter will be moved either into the surface milling cutter 14 or into the edge milling cutter 15. In this way, the surface or the circumference of the third lens blank 100c will be machined.

The turning device 50 and the milling device 10 are connected via a loading device 30, which is designed to remove lens blanks 100a, 100b, 100c, 100d from the milling device 10 and load them into the work piece spindles 52a, 52b. For this, a movable transport means 31 has several holding means 34, in particular, two. In this way, the transport means 31 also forms a lens magazine 32, in which milled lens blanks, here a fourth lens blank 100*d*, are kept temporarily prior to being loaded into the work piece spindles 52*a*, 52*b*.

The turning device 50 and the loading device 30 can optionally be designed as shown in FIGS. 1 to 4.

Furthermore, the design option exists of mounting the milling device 10, the turning device 50 and in some cases also the loading device 30 on a common machine frame and/or a common machine bed 70. A common machine bed 70 would preferably be monolithic in design. However, a mechanical vibration decoupling between the milling device 10 and the turning device 50 is preferable, especially by foundations separated by the floor.

When the milling device 10, the turning device 50 and preferably the loading device 30 are arranged in a common manufacturing cell 71, safety precautions and housings only need to be provided once. Preferably, the milling device 10 and the turning device 50 furthermore lie in separate work spaces, and the work spaces are preferably separated from each other at least in regard to transfer of machining chips.

With such a fabrication mechanism 1, the methods of the invention can be implemented. In particular, it is possible to load at first a first lens blank 100*a* into the work piece holder 12 and to machine it with the milling tool 13. Next, the first lens blank 100*a* will be removed with the loading device 30 from the work piece holder 12, before a second lens blank 100*b* is loaded into the work piece holder 12 and machined with the milling tool 13. After the second lens blank 100*b* has also removed with the loading device 30 from the work piece holder 12, the first and second lens blank 100*a*, 100*b* can be loaded with the loading device 30 into the work piece spindles 52*a*, 52*b*. Then a simultaneous machining of a third lens blank 100*c* with the milling tool 13 and of the first and second lens blank 100*a*, 100*b* with the turning tools 53*a*, 53*b* is possible.

Refer to the above general description and the claims for possible implementations of the method.

The invention is not limited to the above described embodiments, but rather can be modified in many ways. First and foremost, the features of the turning device, the milling device and the loading device should be considered independently of each other, especially when no (mechanical) interfaces are involved.

All features and benefits emerging from the claims, the description, and the drawing, including design details, spatial arrangements, and steps of the method, can be essential to the invention by themselves or in the most diverse of combinations.

| List of reference numbers | |
|---|---|
| 1 | Fabrication mechanism |
| 10 | Milling device |
| 11 | Milling station |
| 12 | Work piece holder |
| 13 | Milling tool |
| 14 | Surface milling cutter |
| 15 | Edge milling cutter |
| 30 | Loading device |
| 31 | Transport means |
| 32 | Lens magazine |
| 33 | Conveyor rail |
| 34 | Holding means |
| 35 | Transport arm |
| 50 | Turning device |
| 51a | First turning station |
| 51b | Second turning station |
| 52a | First work piece spindle |
| 52b | Second work piece spindle |
| 53a | First turning tool |
| 53b | Second turning tool |
| 54 | Control electronics |
| 70 | Machine bed |
| 71 | Manufacturing cell |
| 72 | Housing shell |
| 73 | Transverse drive |
| 74 | Linear drive |
| 75a | First fast tool servomotor |
| 75b | Second fast tool servomotor |
| 100a | First lens blank |
| 100b | Second lens blank |
| 100c | Third lens blank |
| 100d | Fourth lens blank |
| 100e | Fifth lens blank |
| A1 | Spindle axis (first work piece spindle) |
| A2 | Spindle axis (second work piece spindle) |
| A3 | Turning axis (work piece holder) |
| E1 | Spindle plane (work piece spindles) |
| E2 | Tool plane (turning tools) |
| S1a | Drive signal (first work piece spindle) |
| S1b | Drive signal (second work piece spindle) |
| S2 | Drive signal (transverse drive) |
| S3 | Drive signal (linear drive) |
| S4a | Drive signal (first fast tool servomotor) |
| S4b | Drive signal (second fast tool servomotor) |
| T | Infeed depth (fast tool servomotor) |
| X1 | Spacing (turning tools - spindle axis) |
| X2 | Spacing (turning tool - work piece spindle) |

The invention claimed is:

1. A fabrication mechanism (1) for manufacturing of eyeglass lenses from lens blanks (100*a*, 100*b*, 100*c*, 100*d*, 100*e*), with a milling device (10) and with a turning device (50),
    wherein the milling device (10) has at least one milling station (11) with a work piece holder (12) to hold a lens blank (100*a*, 100*b*, 100*c*, 100*d*, 100*e*) and a milling tool (13) for machining the lens blank (100*a*, 100*b*, 100*c*, 100*d*, 100*e*), and
    wherein the turning device (50) has a first turning station (51*a*) with a rotatable first work piece spindle (52*a*) to hold a lens blank (100*a*, 100*b*, 100*c*, 100*d*, 100*e*) and a first turning tool (53*a*) for machining of a lens blank (100*a*, 100*b*, 100*c*, 100*d*, 100*e*),
    wherein the turning device 50 has at least one second turning station (51*b*) with a rotatable second work piece spindle (52*b*) to hold a second lens blank (100*a*, 100*b*, 100*c*, 100*d*, 100*e*) and a second turning tool (53*b*) for the machining of a second lens blank (100*a*, 100*b*, 100*c*, 100*d*, 100*e*); wherein a loader (30) is provided, which is configured to remove lens blanks (100*a*, 100*b*, 100*c*, 100*d*, 100*e*) from the milling device (10) and load them into the rotatable first and second work piece spindles (52*a*, 52*b*) and further wherein the turning device (50) is provided with the loader (30), being further configured to load lens blanks (100*a*, 100*b*, 100*c*, 100*d*, 100*e*) into the rotatable first and second work piece spindles (52*a*, 52*b*).

2. The fabrication mechanism (1) according to claim 1, characterized in that the loader (30) has a pair of holding means (34) for each turning station (51*a*, 51*b* 52*a*, 52*b*) to hold two lens blanks (100*a*, 100*b*, 100*c*, 100*d*, 100*e*), the holding means (34) of the pairs being oriented at an angle to each other and interconnected, and the pairs of holding means (34) being able to rotate about a common turning axis.

3. The fabrication mechanism (1) according to claim 1, characterized in that the work piece spindles (52a, 52b) of the turning device (50) have parallel oriented spindle axes (A1, A2).

4. The fabrication mechanism (1) according to claim 1, characterized in that the work piece spindles (52a, 52b) of the turning device (50) are arranged in a common spindle plane (E1).

5. The fabrication mechanism (1) according to claim 1, characterized in that the turning stations (51a, 51b) have a common transverse drive (73) with which a spacing (X1) of the turning tools (53a, 53b) relative to the spindle axis (A1, A2) of a coordinated work piece spindle (52a, 52b) can be changed.

6. The fabrication mechanism (1) according to claim 5, characterized in that turning stations (51a, 51b) have a common linear drive (74) with which a spacing (X2) of the turning tools (53a, 53b) relative to a coordinated work piece spindle (52a, 52b) can be changed and each turning tool (53a, 53b) has its own tool servomotor (75a, 75b), by which an infeed depth (T) can be changed with respect to a coordinated work piece spindle (52a, 52b) and the turning device (50) has a control electronics (54) to put out drive signals (S1a, S1b, S2, S3, S4a, S4b) to the work piece spindles (52a, 52b), the common transverse drive (73), the common linear drive (74) and the tool servomotors (75a, 75b), wherein the drive signals (S1a, S1b, S2, S3, S4a, S4b) of the control electronics (54) are matched up with each other.

7. The fabrication mechanism (1) according to claim 1, characterized in that the turning stations (51a, 51b) have a common linear drive (74) with which a spacing (X2) of the turning tools (53a, 53b) relative to a coordinated work piece spindle (52a, 52b) can be changed.

8. The fabrication mechanism (1) according to claim 7, characterized in that each turning tool (53a, 53b) has its own tool servomotor (75a, 75b), by which an infeed depth (T) can be changed with respect to a coordinated work piece spindle (52a, 52b) and the common linear drive (74) has a maximum first travel and the tool servomotors (75a, 75b) a maximum second travel, while the maximum first travel corresponds to at least 10 times the maximum second travel.

9. The fabrication mechanism (1) according to claim 1, characterized in that each turning tool (53a, 53b) has its own tool servomotor (75a, 75b), by which an infeed depth (T) can be changed with respect to a coordinated work piece spindle (52a, 52b).

10. The fabrication mechanism (1) according to claim 1, characterized in that the turning device (50) has 1.5 to 2.5 times as many turning stations (51a, 51b) as the milling device (10) has milling stations (11).

11. The fabrication mechanism (1) according to claim 1, characterized in that the milling device (10) has precisely one milling station (11) and the turning device (50) precisely two turning stations (51a, 51b).

12. The fabrication mechanism (1) according to claim 1, characterized in that the milling device (10) and the turning device (50) have a common machine frame and/or a common machine bed (70).

13. The fabrication mechanism (1) according to claim 1, characterized in that the milling device (10) and the turning device (50) are vibration-decoupled.

14. The fabrication mechanism (1) according to claim 1, characterized in that the milling device (10) and the turning device (50) are arranged in a common manufacturing cell (71).

15. The fabrication mechanism (1) according to claim 1, characterized in that the milling device (10) and the turning device (50) are arranged in separate work spaces, while the work spaces are preferably separated from each other at least in regard to a transfer of machining chips.

16. The fabrication mechanism (1) according to claim 1, characterized in that the loader (30) has transport means (31) for the transport of a lens blank (100a, 100b, 100c, 100d, 100e) from the milling station (11) to the turning stations (51a, 51b).

17. The fabrication mechanism (1) according to claim 1, characterized in that the loader (30) has a lens magazine (32) for at least one lens blank (100a, 100b, 100c, 100d, 100e).

18. A method for the operation of a fabrication mechanism (1) according to claim 1, characterized by the following steps:
   a) loading of a first lens blank (100a) into the work piece holder (12) and machining of the first lens blank (100a) with the milling tool (13);
   b) removal of the first lens blank (100a) from the work piece holder (12) with the loading device (30);
   c) subsequent loading of a second lens blank (100b) into the work piece holder (12) and machining of the second lens blank (100b) with the milling tool (13);
   d) subsequent removal of the second lens blank (100b) from the work piece holder (12) with the loading device (30);
   e) loading of the first and second lens blank (100a, 100b) into the work piece spindles (52a, 52b) with the loading device (30), and loading of a third lens blank (100c) into the work piece holder (12);
   f) simultaneous machining of the third lens blank (100c) with the milling tool (13) and of the first and second lens blank (100a, 100b) with the turning tools (53a, 53b).

19. The method according to claim 18, characterized by the following steps:
   g) removal of the third lens blank (100c) from the work piece holder (12) with the loading device (30) and loading of a fourth lens blank (100d) into the work piece holder (12) and machining of the fourth lens blank (100d) with the milling tool (13) during the machining of the first and the second lens blank (100a, 100b) with the turning tools (53a, 53b).

20. The method according to claim 19, characterized by the following steps:
   h) removal of the first and the second lens blank (100a, 100b) from the work piece spindles (52a, 52b);
   i) subsequent loading of one or the third and one or the fourth lens blank (100c, 100d) into the work piece spindles (52a, 52b) with the loading device (30) and loading of a fifth lens blank (100e) into the work piece holder (12);
   j) repeating of steps f) through i).

21. The method according to claim 18 and for the operation of a turning device (50), characterized in that each turning tool (53a, 53b) has its own tool servomotor (75a, 75b), by which an infeed depth (T) can be changed with respect to a coordinated work piece spindle (52a, 52b), and control electronics are provided, the control electronics (54) attuning drive signals (S1a, S1b, S2, S3, S4a, S4b) with each other such that the drive signals (S4a, S4b) for the tool servomotors (75a, 75b) accomplish an at least temporary opposite running of the tool servomotors (75a, 75b) for vibration dampening.

* * * * *